Dec. 5, 1933.  A. SOUCEK  1,937,535
FILLER CAP
Filed Jan. 21, 1932
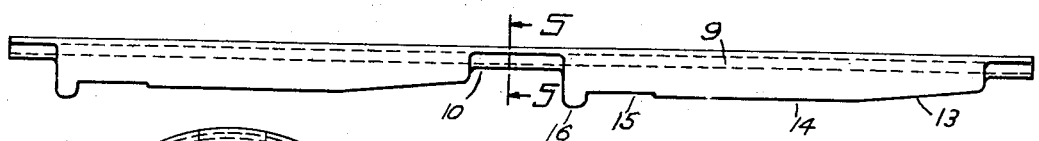
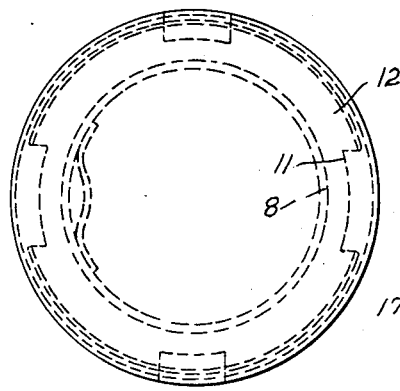
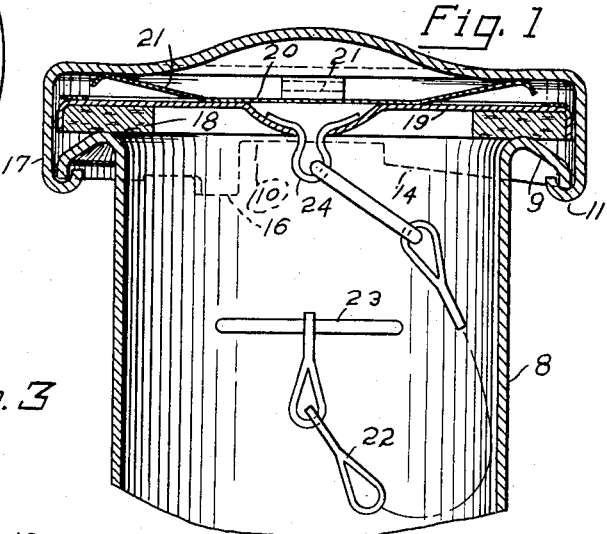
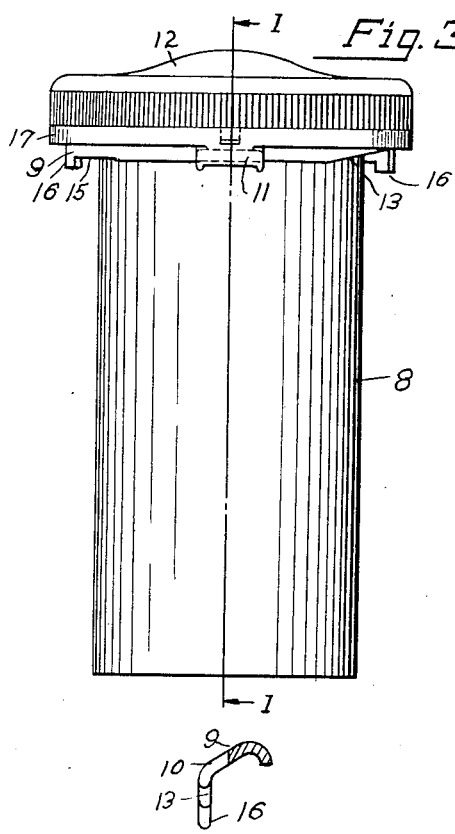
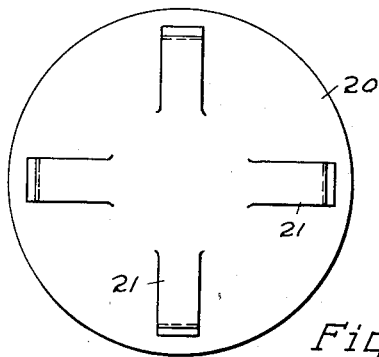
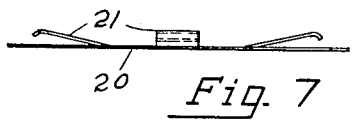
INVENTOR
Apollo Soucek.
BY
ATTORNEY Patented Dec. 5, 1933

1,937,535

UNITED STATES PATENT OFFICE 1,937,535

FILLER CAP

Apollo Soucek, United States Navy

Application January 21, 1932. Serial No. 587,916

1 Claim. (Cl. 220—40)

(Granted under the act of March 3, 1883, as amended April 30, 1928; 370 O. G. 757)

This invention relates to a cap for the tube through which liquid fuels are introduced into the fuel tanks of automotive vehicles.

The object of this invention is to provide a cap of the type specified that will prevent leakage from the tank and will be positively locked in position to prevent displacement by vibration of the mechanism on which the tank is carried.

With the above and other objects in view, the invention consists in the construction, combination and arrangement of parts as will be described more fully hereinafter.

In the drawing:

Fig. 1 is a longitudinal section of a filling tube with my novel cap in place thereon, taken on line 1—1 of Fig. 3;

Fig. 2 is a top plan view of the present invention;

Fig. 3 is a side elevation thereof;

Fig. 4 is a development of the locking flange on the filling tube;

Fig. 5 is a cross section taken on line 5—5 of Fig. 4;

Fig. 6 is a bottom plan view of the spring washer;

Fig. 7 is a side view of the spring washer.

Filling tube 8 is provided at its upper end with an outwardly turned locking flange 9 wherein are cutaway portions 10 through which the recurved locking tabs 11 of the cap 12 may be passed to hook reflexed ends of the tabs over the edge of the flange. Adjacent each cut away portion is a sloping face 13 that merges into a straight portion 14 which leads to a notch 15 adapted to engage the tab 11 to prevent accidental rotation of the cap. A stop 16 is formed at the farther end of notch 15 to prevent rotation of the cap beyond the locking position.

The tabs 11 are formed on peripheral flange 17 of cap 12. Within the cap is disposed a gasket 18 of cork or other suitable material seated, with a pressed fit, in a gasket retainer 19. The gasket is of such dimensions that it bears against the top of tube 8 to make a fluid-tight seal. A washer 20 is positioned between the gasket retainer and the closed end of cap 12. This washer has spring arms 21 that apply sufficient pressure to the gasket to maintain a tight seal, but yield slightly to permit the releasing of the tabs 11 from notches 15. It will be noted that this construction permits rotation of cap 12 without corresponding movement of the gasket on tube 8, which latter movement would result in reduction of the thickness of the gasket through attrition to the point that the cap would leak.

Cap 12 is tethered to tube 8 by a flexible element 22, such as a light chain or other suitable device, whereof one end is secured to an eye 23 in tube 8 and the other is attached to gasket retainer 19 by a link 24 passed therethrough and secured in a manner to make a fluid tight joint.

The cap is applied by passing tabs 11 through cutaway portions 10 and then rotating the cap. The tabs slide along flange 9, the sloping faces 13 drawing gasket 18 tightly against tube 8 by the deflection of spring arms 21, until the notches 15 are reached, when the tension of the spring arms seats the tabs firmly in the notches and the shouldered edges of the notches prevent accidental dislodgment of the tabs therefrom. To remove the cap enough pressure must be applied to it to clear the tabs from their respective notches and the cap is then rotated until the tabs register with cut away portions 10, when the cap may be lifted off the tube.

It will be understood that the above description and accompanying drawing comprehend only the general and preferred embodiment of my invention, and that various changes in construction, proportion and arrangement of parts may be made within the scope of the appended claim without sacrificing any of the advantages of this invention.

The invention described herein may be manufactured and used by or for the Government of the United States of America for governmental purposes without the payment of any royalties thereon.

I claim:

In combination, a filling tube having an outwardly turned flange at its free end, said flange having cutaway portions, sloping portions leading from said cutaway portions, portions parallel to the free end surface of said tube leading from said sloping portions, locking notches at the other ends of said parallel portions, and stops at the farther ends of said notches; and a cap having a laterally turned flange, inwardly turned hook tabs on said flange spaced to correspond to the cut-away portions of the flange on said tube and adapted to embrace the flange on said tube, a compressible annular gasket in said cap, a gasket retainer having a plane closed end and a flange turned laterally therefrom in which said gasket is disposed, a plane washer disposed between said retainer and the closed end of said cap, said washer having resilient arms struck therefrom and bearing against the closed end, a link sealed into said retainer in a manner not to impair the fluid-tight integrity of said retainer, and flexible means to tether said cap to said tube.

APOLLO SOUCEK.